Feb. 10, 1970   R. D. RUSSO ET AL   3,494,352
APPARATUS FOR TAKING MULTIPLE SAMPLES
Original Filed Aug. 18, 1966   3 Sheets-Sheet 1

INVENTOR.
RONALD D. RUSSO
BY
Kane, Dalsimer, Kane & Smith
ATTORNEYS

Feb. 10, 1970  R. D. RUSSO ET AL  3,494,352
APPARATUS FOR TAKING MULTIPLE SAMPLES
Original Filed Aug. 18, 1966  3 Sheets-Sheet 2

INVENTOR.
RONALD D. RUSSO
BY
Kane Dalsimer, Kane & Smith
ATTORNEYS

INVENTOR.
RONALD D. RUSSO

United States Patent Office 3,494,352
Patented Feb. 10, 1970

3,494,352
APPARATUS FOR TAKING MULTIPLE SAMPLES
Ronald D. Russo, East Rutherford, and James C. Halligan, Rodburn, N.J., assignors to Becton, Dickinson and Company, East Rutherford, N.J., a corporation of New Jersey
Continuation of application Ser. No. 592,704, Aug. 18, 1966. This application Mar. 26, 1969, Ser. No. 810,850
Int. Cl. A61b 5/10; A61m 1/00
U.S. Cl. 128—2                                11 Claims

ABSTRACT OF THE DISCLOSURE

A valve assembly for use in controlling the flow of fluid from a fluid source to a collection container. The assembly includes a cannula for introduction to a fluid source mounted on a housing having a passage therethrough. A puncturable self-sealing valve closure means is mounted on the housing and closes the passage at one portion of the housing. A double ended cannula which has at least one end portion slidably disposed in the passage with the other end projecting outwardly therefrom so that the double ended cannula can be shifted inwardly in the housing to cause the one end portion to pierce through the closure means. This permits fluid to flow from the source through the valve assembly and out of the outwardly projecting end portion of the double ended cannula. The cannula can also be shifted outwardly to withdraw the one end portion from the closure means thereby preventing flow of fluid out of the outwardly projecting end portion of the double ended cannula. Also, interfering stop means is positioned on the double ended cannula and housing to limit the relative movement therebetween to thereby facilitate the collection of multiple samples of fluid.

This application is a continuation of Ser. No. 592,704, filed Aug. 18, 1966 and now abandoned.

This invention relates to an improved valve to be used as part of a needle assembly which may be connected to a sample collection assembly to be used for the collection of multiple samples of a fluid without loss of fluid and without having to remove the needle from the fluid source. There results a low cost disposable valve assembly which operates automatically and requires no special operator handling technique.

Special operator technique is generally required when taking multiple samples of a fluid in order to prevent loss of the fluid while changing collection containers. For explanation purposes, in this disclosure I will use blood as the fluid being collected, however, many other types of fluids may also be collected by the method and apparatus disclosed herein. In collecting multiple samples of blood, the operator has to use careful procedures to avoid a backflow of blood which could soil the bed linen of the patient and cause consequent physical and psychological discomfort to the patient. Often, external controls such as exterior tubes, adapters, plungers or shut-off valves are used and manipulated to control the backflow of blood. This naturally creates extra equipment and therefore extra operator attention to control the equipment. Also, the addition of more equipment adds to the cost of the apparatus and thereby possibly requiring reuse and consequently resterilization of the parts. If the above mentioned external controls are not used, then the operator would have to exercise control over the intravenous needle and of the assembly. Repeated punctures of a vein to take multiple samples of blood is uncomfortable to the patient and also could cause collapse of the vein. If the operator occludes the lumen of the needle against the vein to stop the flow of blood the needle could puncture the vein again and cause the operator to relocate the needle once again adding to the discomfort to the patient. Naturally when the operator is occupied with any of the above mentioned techniques of blood control, his hands are not free to perform other needed tasks.

It is therefore an object of this invention to provide an improved valve assembly to be used as part of a fluid collection assembly to collect multiple samples of a fluid such as blood, which will alleviate the above mentioned problems.

Another object of this invention is to provide an improved needle assembly which may be used to take multiple samples of fluid such as blood, without any loss of fluid while changing the collecting means for each sample.

A further object of this invention is to provide an improved valve assembly for use in collecting multiple samples of a fluid such as blood which is completely automatic in operation, is located within the needle assembly itself and controls fluid flow as needed multiple samples of fluid are collected.

Another object of this invention is to provide an improved valve assembly which is contained within a needle assembly used for collection of multiple samples of a fluid thereby eliminating the need for external attachments and resulting in a compact low cost, efficient to use collection assembly which may be disposed of after single use thereby eliminating the need for extensive resterilization processes.

In this invention I have provided a valve assembly for use in controlling the fluid flow from a fluid source to a collection container. The assembly comprises a housing having a passage therethrough, a puncturable self-sealing valve closure means mounted on the housing enclosing the passage at one portion thereof. A double ended cannula having at least one end portion slidably disposed in the passage with the outer end projecting outwardly therefrom so that the cannula can be shifted inwardly in the housing to cause the one end portion to pierce through the closure means and shifted outwardly to withdraw the one end portion from the closure means and interfering stop means on the double ended cannula so as to limit the relative movement between the double ended cannula and the closure means.

With these and other objects in mind, reference is had to the attached drawings illustrating the invention in which.

Figure 3:
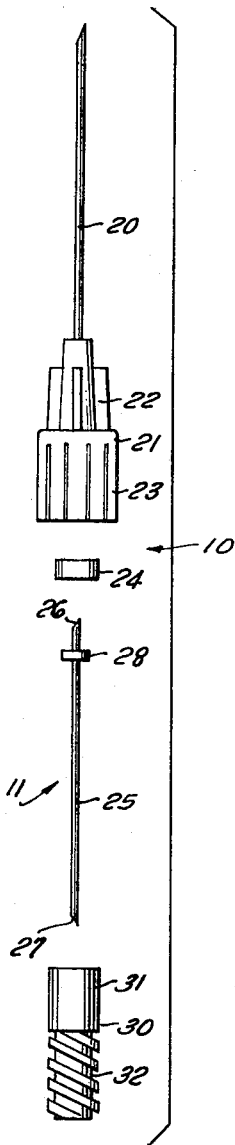
FIG. 3 is an exploded elevational plan view of a needle assembly embodying the invention.
Figure 4:
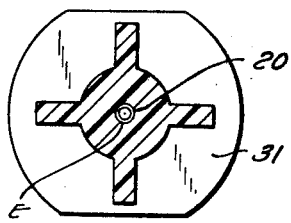
FIGS. 4–6 are cross-sectional views taken in the direction of the arrows on lines 4—4, 5—5 and 6—6 of FIG. 2.
Figure 5:
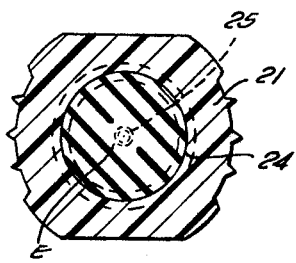
Figure 6:
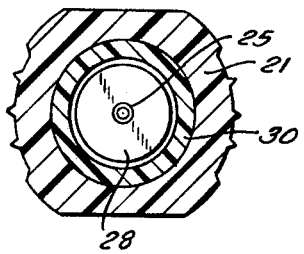

FIG. 3 shows the primary parts of the multiple fluid collecting assembly 10 in a predominately disassembled state. There is a common intravenous type cannula 20 which may be used to enter the fluid source. Other types of needles may be employed depending upon the type of fluid to be collected. For purposes of description in this disclosure, blood will be used as the liquid being collected. There are many other liquids which may be collected by using this improved valve assembly as part of a multiple sample collection assembly, for example, spinal fluid or other body fluids. The shank end of cannula 20 is connected to the forward end 22 of a common type of female hub 21. This connection is accomplished by a common means of fastening such as by means of an epoxy resin.

The elements which comprise the valve assembly 11 include a male type hub or housing 30 and slidably disposed therein is a double-ended cannula 25 with a stop ring 28 fastened near one end thereof and a self-sealing puncturable diaphragm 24 mounted on one end of housing 30.

Figure 2:
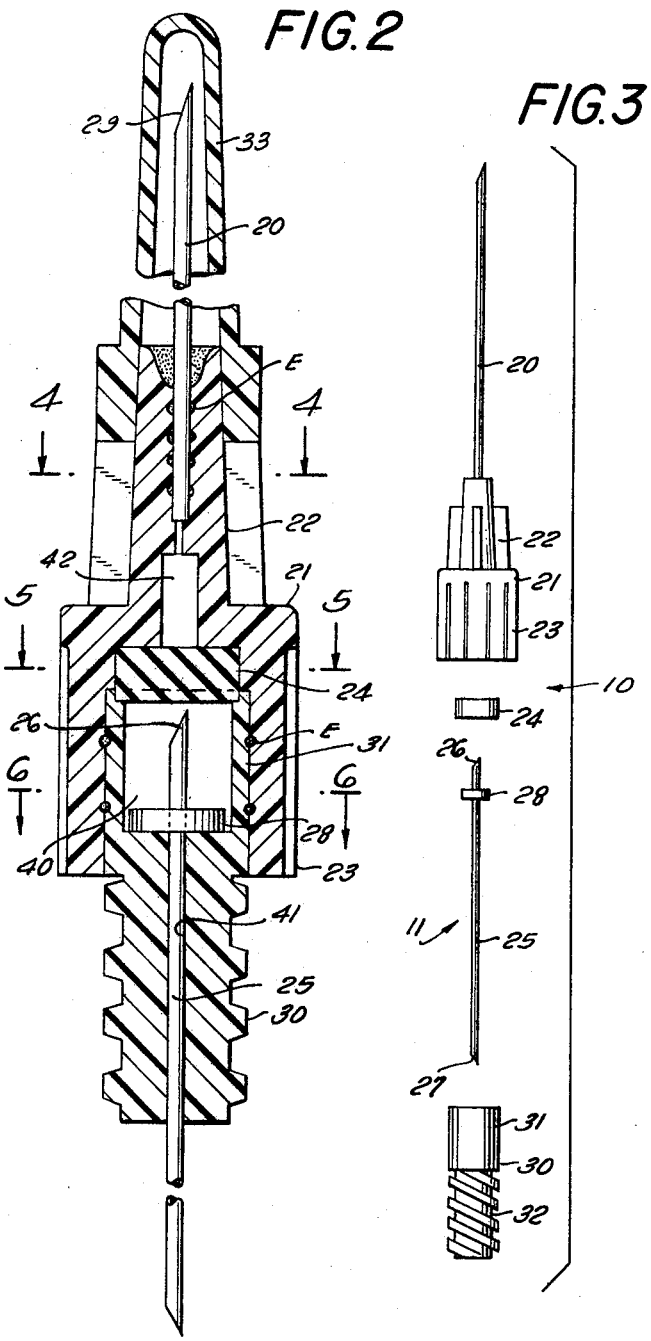
FIG. 2 is a longitudinal sectional view of the assembly embodying the invention.
Figure 7:
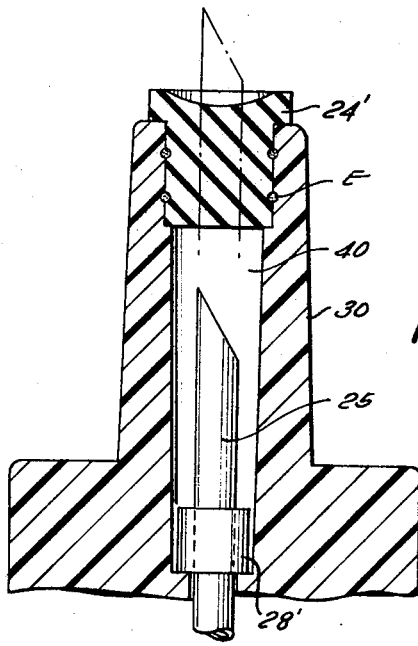
FIG. 7 is a fragmentary sectional view of the valve means in an alternate embodiment of the invention showing the position of the elements with the valve closed and in phantom showing the position of the elements with the valve open.
Figure 8:
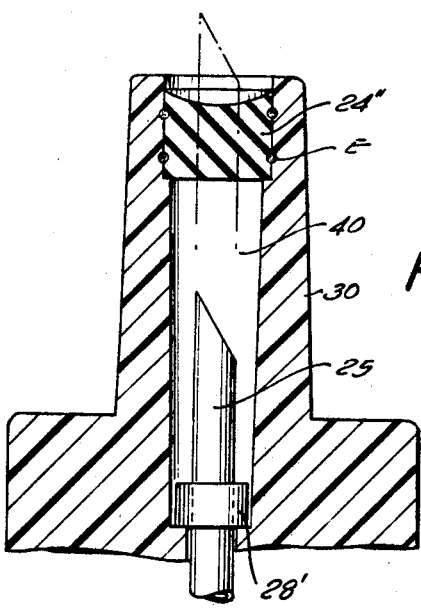
FIG. 8 is a fragmentary sectional view of a valve means containing a second alternate embodiment of the invention and showing the position of the elements of the valve closed and in phantom showing the position of the elements with the valve open.

FIG. 2 depicts how the aforementioned various elements of collection assembly 10 embodying improved valve means 11 are interconnected. As mentioned before, cannula 20 is fastened within the forward end 22 of female hub 21 by means of an epoxy resin E or some similar adhesive substance. The double-ended cannula 25 is loosely or slideably housed within bore 41 in housing 30. Self-sealing puncturable diaphragm 24 which may be formed of a suitable elastomeric material and which is inert to the fluid being collected, for example, natural or synthetic rubber or other polymeric materials having elastomeric properties, is mounted in position by a suitable means such as epoxy resin E on forward end 31 of housing 30. As shown, forward end 31 of housing 30 has a cavity which serves to provide chamber 40 when diaphragm 24 is mounted on forward end 31 of housing 30. The forward tip 26 of double-ended cannula 25 extends within chamber 40. A stop ring 28 is mounted to double-ended cannula 25 near its forward tip 26. Stop ring 28 is larger than bore 41 and is also smaller in diameter than chamber 40. Thus, stop ring 28 limits the displacement of cannula 25 within chamber 40 when it contacts the inner surface of diaphragm 24 in its forward movement and when it contacts the rear surface of chamber 40 in its rearward movement. When cannula 25 is shifted inwardly a distance equal to chamber 40, tip 26 pierces diaphragm 24 as seen in FIGS. 7 and 8. Stop ring 28 may be constructed of any suitable material which may be mounted or formed in cannula 25 in any conventional manner.

Forward end 31 of housing 30 is coupled to the rear end 23 of hub 21 and may be sealed thereto by any suitable means such as by an epoxy resin E as illustrated in FIG. 2. As depicted, when housing 30 is coupled to hub 21, diaphragm 24 forms a partition means so as to interrupt the continuous passage formed in collection assembly 10.

It can be seen that when slidable cannula 25 is shifted inwardly the length of chamber 40, its tip 26 will pierce diaphragm 24 and enter passageway 42 in the forward end 22 of hub 21 so as to provide a continuous passage from tip 29 of intravenous cannula 20 to rear tip 27 of double-ended cannula 25. When tip 26 of cannula 25 is removed from diaphragm 24, the above mentioned passage will be resealed by self-sealing diaphragm 24 thereby providing a valve means.

A sheath 33 is provided to maintain the sterility of intravenous cannula 20. This sheath 33 is constructed of a plastic material and encompasses the entire exposed surface of cannula 20. The open end of sheath 33 fits on and is held in frictional engagement with forward end 22 of female hub 21. It may be easily removed by hand thereby freeing cannula 20 for insertion into the vein. All of the parts of collection assembly 10 may be constructed of a low cost type of material such as plastic for the hub, common rubber compound for the diaphragm, and any type of common disposable cannula material may be used. This economic type of construction lends itself to the production of a disposable type of valve assembly.

FIG. 1 and FIGS. 9–12 show collection assembly 10 connected to a typical blood collection container assembly. For illustrative purposes in this disclosure a common type of evacuated collecting tube 35 with a self-sealing puncturable rubber stopper 36 on its open end and a holder 34 is used. Coupling of the parts may be accomplished by means of a threaded interengagement between rear end 32 of housing 30 and the forward end of holder 34. When the needle assembly is thus engaged with holder 34, rear tip 27 of cannula 25 is positioned within holder 34. The colection assembly 10 is then in operable position for taking multiple blood samples.

FIGS. 7–8 depict two alternative embodiments for the shape and positioning of diaphragm 24. Rather than placing and fastening diaphragm 24 on the most forward surface of housing 30 as shown in FIG. 2, FIG. 7 shows self-sealing diaphragm 24' in the form of a plug which is sealed within chamber 40 of housing 30 by means of an epoxy resin E and which has an extending head portion which extends beyond and engages with the forward edge of housing 30.

FIG. 8 shows a diaphragm 24" positioned within the bore of housing 30 with no portion of diaphragm 24" extending beyond the forward edge of the housing. Epoxy resin E may be used as the sealing means. In phantom lines in both FIGURES 7 and 8, the position of slideable double ended-cannula 25 is shown after it has passed through the diaphragm which is equivalent to a valve in open position and is shown in solid lines with the tip of cannula 25 withdrawn from the diaphragm which is equivalent to a valve in closed position. Also, as shown in FIGS. 7 and 8 stop ring 28' is formed of a suitable moldable material such as an epoxy resin and is mounted on cannula 25 to restrict its displacement in chamber 40 as described above relative to stop ring 28.

Figure 1:
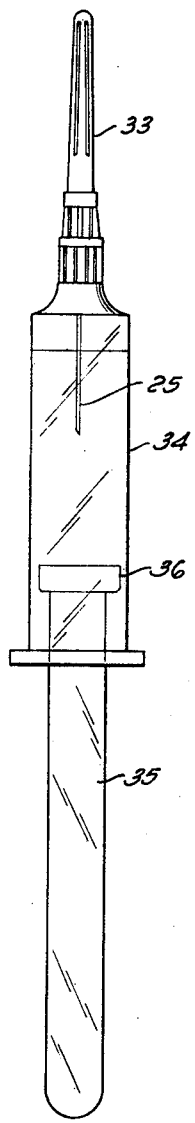
FIG. 1 is an elevational plan view of a multiple sample collection assembly which embodies the invention.

FIG. 1 shows fluid collection assembly 10 embodying this invention connected to a sample collecting device ready for operational use.

FIGS. 9–12 illustrate the actual steps for operating this combination to collect multiple blood samples.

Figure 9:
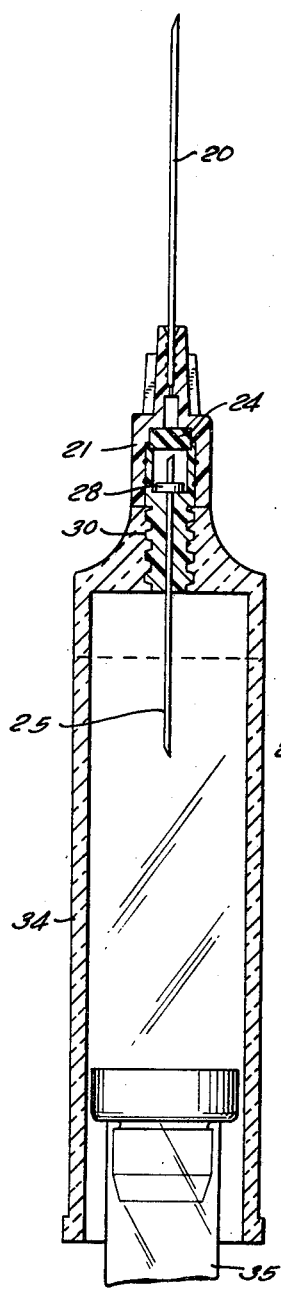
FIGS. 9–12 are sectional elevation views of a multiple sample collection assembly embodying the invention and depicting the operational steps required when used to collect multiple samples of blood.

In FIG. 9 all the parts of the assembly are shown positioned just prior to the initiation of the collection process.

Figure 10:
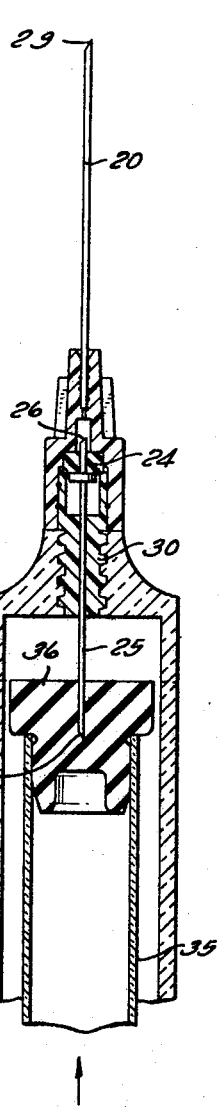

In FIG. 10, the evacuated collecting tube 35 has been moved forward and brought into contact with the rear tip 27 of slideable double-ended cannula 25. Tip 27 of cannula 25 pierces and enters rubber stopper 36 of collecting tube 35. The force of entering stopper 36 creates a reactive force which moves cannula 25 within housing 30 until forward tip 26 of cannula 25 pierces and passes through diaphragm 24. When cannula 25 is in this position, a passageway from tip 29 of intravenous cannula 20 to the rear tip 27 of cannula 25 is formed. Rear tip 27, at this time, is still embedded in stopper 36 of collecting tube 35 prior to entering vein 48.

Figure 11:
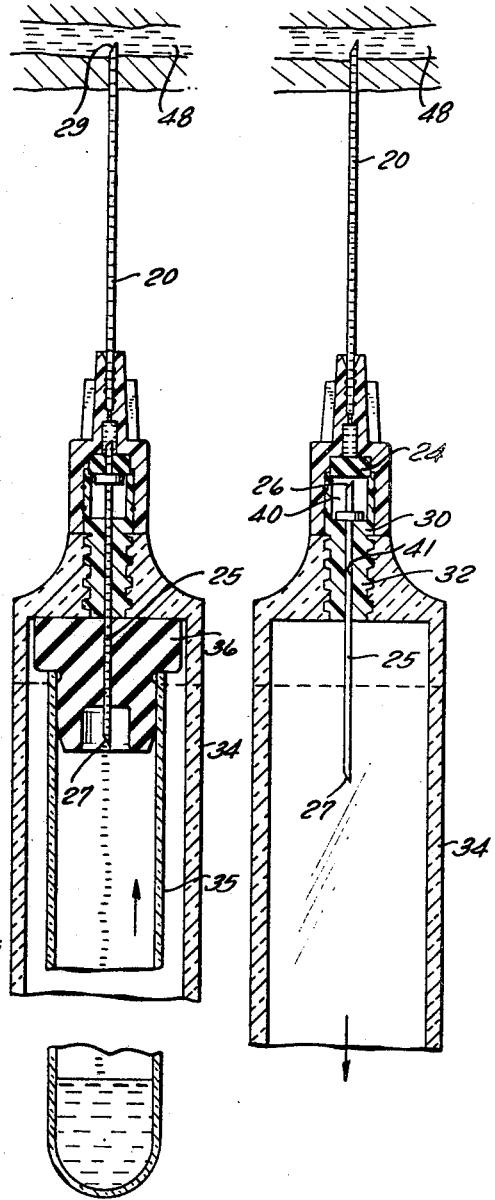

As shown in FIG. 11, tip 29 of cannula 20 is inserted into vein 48 and then the evacuated collecting tube 35 is forced forward to its fullest extent within holder 34. This results in the rear tip 27 of cannula 25 passing entirely through rubber stopper 36 and into the evacuated collecting tube 35. A continuous passageway is now open for blood to flow from the vein 48 into the collecting tube 35.

Figure 12:
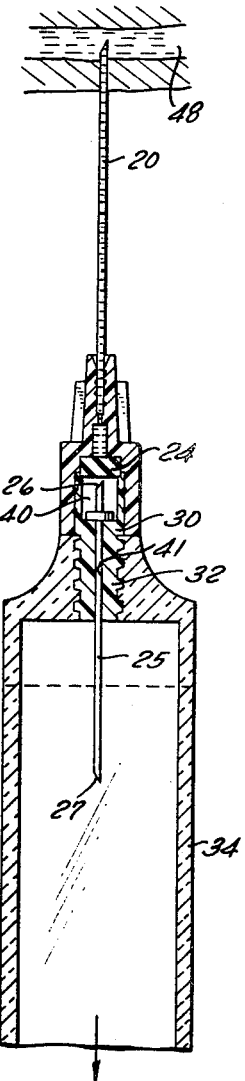

As shown in FIG. 12, when sufficient blood has been collected, to remove the collecting tube and replace it with a new collecting tube for an additional sample, all that need be done is to withdraw tube 35. As collecting tube 35 is withdrawn and the rear tip 27 of cannula 25 is drawn through rubber stopper 36, the force necessary to overcome the frictional force between stopper 36 and cannula 25 is a sufficient reactive force to withdraw slideable double-ended cannula 25 from diaphragm 24. When tip 26 has been removed from diaphragm 24 no further fluid flow will occur.

Since the diameter of double ended cannula 25 is smaller than the diameter of bore 41 in the rear end 32 of housing 30 in which it is disposed, an air passageway is provided into chamber 40. As can be seen in FIG. 12, when collection tube 35 is withdrawn from cannula 25, forward tip portion 26 is removed from diaphragm 24 and air under atmospheric pressure passes through the air passageway into chamber 40 thereby forcing the air in chamber 40 through cannula 25 to remove residual blood contained therein. In addition, any residual blood left on or around the rear end of cannula 25 will be removed when cannula 25 is withdrawn from stopper 36 of collection tube 35. Therefore, an unclogged cannula is provided for succeeding collection tubes to be used after collection tube 35 has been removed, thereby facilitating the collection of multiple samples of blood.

After the collection tube has been removed and while the intravenous cannula is still in position within the vein, valve assembly 11 is in a closed position and will prevent blood flow. The technique for the person taking the sample is only required to obtain a second collection tube and insert it into holder 34 and proceed as described above to open the valve assembly 11 and collect another sample. This procedure may be repeated until all of the desired samples are collected.

As can be seen, the result is a compact multiple fluid collection assembly which employs automatic valve means and when connected to a sample collecting container facilitates the collection of multiple samples of a fluid such as blood, without any backflow or loss of blood in the process. There is no difficult operating procedure to follow, and there are no external valve means or devices of any type which complicate the assembly. The assembly is economically constructed of disposeable materials, is presented and maintained in sterile condition and is efficient and easy to use.

Thus the above mentioned objects of the invention, among others, are achieved and many variations in design and changes in materials employed may be made without departing from the spirit and scope of the invention as defined in the appended claims.

We claim:

1. Device for facilitating the collection of multiple fluid samples in a multiple of fluid collection containers wherein the multiple fluid samples are collected upon mounting the fluid sampling device in situ on the body with a single penetration of the body walls, the fluid device comprising:
   a needle assembly having a forward penetrating end for penetration into the body walls;
   means for coupling said assembly with a holder for directing the multiple fluid sample containers in coupling relationship with the needle assembly;
   the needle assembly having a rearward end for coupling with the sample container and adapted to being in fluid communication with the interior of the container when the container is mounted for association therewith;
   the needle assembly having a passage network for directing liquid from the body to the collection container; and
   a valve mounted on said needle assembly and being adapted to assume a first position prior to the coupling of the sample collection container to close the passage network of the needle assembly and adapted to be shifted to a second position at which it opens the passage network of the needle assembly to permit the liquid to pass from the body when said sample collection container is coupled to said needle assembly and adapted to return to the first position, wherein the passage network is again closed, when the sample collection container is removed from said needle assembly.

2. Device for facilitating the collection of multiple fluid samples in a multiple of fluid collection containers wherein the multiple fluid samples are collected upon mounting the fluid sampling device in situ on the body with a single penetration of the body walls, the fluid device comprising:
   a needle assembly having a forward penetrating end for penetration into the body walls;
   said needle assembly including a housing having a passage therethrough and a cannula mounted thereon to form said forward penetrating end;
   means for coupling said assembly with a holder for directing the multiple fluid sample containers in coupling relationship with the needle assembly;
   the needle assembly having a rearward end for coupling with the sample container and adapted to be in fluid communication with the interior of the container when the container is mounted in association therewith;
   a double ended cannula having at least one portion slideably disposed in the passage in said housing and with the other end projecting outwardly therefrom to form said rearward end for coupling with the sample container;
   the needle assembly having a passage network for directing liquid from the body to the collection container including passage through said cannula, the passageway in said housing and said double ended cannula;
   a valve mounted on said needle assembly and being adapted to assume a first position prior to the mounting of the sample to close the passage network of the needle assembly and adapted to be shifted to a second position at which it opens the passage network of the needle assembly to permit the liquid to pass from the body;
   said valve including a puncturable self-sealing valve closure means mounted on said housing and closing the passage through said housing at one portion thereof, said double ended cannula having at least one portion slideably disposed in said passage with the other end projecting outwardly therefrom so that the double ended cannual can be shifted inwardly in said housing to cause the one end portion to pierce through the closure means to permit fluid to flow from the body through the needle assembly and out of the rearward end of said double ended cannula into the sample collection container and shifted outwardly to withdraw said one end portion from the closure means to prevent flow of fluid out of said rearward end; and
   interfering stop means on said double ended cannula and housing to limit the relative movement therebetween.

3. The invention in accordance with claim 2 wherein the outer diameter of the double ended cannula disposed in said passage is substantially smaller than the inner diameter of the passage of the housing so as to provide an air passage means between said cannula and the walls defining said passage.

4. The invention in accordance with claim 2 wherein a holder is coupled to said needle assembly, said holder having essentially a hollow cylindrical configuration to receive the rearward end of said double ended cannula and to receive a multiple fluid sample container and direct said container into coupling relationship with the needle assembly.

5. The invention in accordance with claim 2 wherein a multiple fluid sample container is coupled with said needle assembly, said container having a punctureable self-sealing stopper closing the end thereof, said stopper being of sufficient resilience to shift said double ended cannula to said second position at which the passage network of the needle assembly is opened and simultaneously to permit penetration of the rearward end of said double ended cannula into said fluid collection container thereby facilitating collection of a sample and when said collection container is removed from said double ended cannula the resilience of said punctureable stopper will permit said double ended cannula to be withdrawn from said collection container and simultaneously remove said double ended cannula from engagement with said closure means in said housing thereby stopping flow of fluid through said needle assembly.

6. Fluid specimen collecting apparatus for taking multiple samples comprising:
   a collection container;
   a housing having first and second interior chamber portions immediately adjacent each other and formed with first and second bores extending through opposite ends of the housing and communicating respectively with the first and second chamber portions;
   a self-sealing puncturable diaphragm between the chamber portions and normally separating them from each other;
   a first cannula fixedly mounted in said first bore and having a puncture end extending outwardly therefrom for connection to a fluid source and with the other end having communication with the first chamber portion;
   a second double ended cannula slideably mounted in the second bore with its outer end extending outwardly therefrom and with its inner end disposed in said second chamber portion;
   said collection container mounted on the outer end of the double ended cannula; and
   stop means fixedly mounted on said second cannula inside said second chamber portion a short distance from the inner end of the second cannula so that the second cannula can be shifted between a position with the inner end extending through the diaphragm into communication with the first chamber portion thereby permitting fluid to flow from said fluid source to said collection container and a position withdrawn from said diaphragm with the inner end disposed in the second chamber portion thereby preventing fluid from entering said second cannula and facilitating the removal of said collection container from said apparatus and the positioning of a second collection container on said apparatus without significant loss of fluid to facilitate the collection of multiple fluid specimens.

7. The invention in accordance with claim 6 wherein said collection container has a puncturable self-sealing stopper closing its end, and the outer end of said second cannula is adapted to puncture said puncturable self-sealing stopper of said container so that when said fluid specimen collection apparatus is coupled to a blood source, a sample of blood is collected in said container.

8. The invention in accordance with claim 6 wherein said housing is provided with means for mounting a holder for a collection container so as to provide a means to facilitate the coupling of said container to the outer end of said second cannula.

9. The invention in accordance with claim 6 wherein said second chamber portion has a length substantially equal to the displacement of said second cannula in said housing when shifted inwardly therein and equal to the distance between said stop means and said diaphragm.

10. The invention in accordance with claim 6 wherein the outer diameter of said second cannula is substantially smaller than the inner diameter of said second bore so as to provide an air passage means between said second cannula and the wall defining said second bore.

11. The invention in accordance with claim 10 wherein said collecting container is under reduced pressure so that when said container is removed from said second cannula the blood contained in the bore thereof will be removed therefrom by air disposed in said second chamber entering the inner end of said second cannula, thereby preventing clogging of said second cannula so that multiple samples may be collected.

References Cited

UNITED STATES PATENTS

| 2,460,641 | 2/1949 | Kleiner | 128—276 |
| 2,483,825 | 10/1949 | Goldberg. | |
| 2,854,925 | 10/1958 | Crockford et al. | 128—215 |
| 3,143,109 | 8/1964 | Gewertz | 128—2 |
| 3,159,159 | 12/1964 | Cohen | 128—2 |
| 2,955,595 | 10/1960 | Semple | 128—214 |

FOREIGN PATENTS

| 920,604 | 3/1963 | Great Britain. |
| 950,588 | 3/1949 | France. |

RICHARD A. GAUDET, Primary Examiner

MARTIN F. MAJESTIC, Assistant Examiner

U.S. Cl. X.R.

128—276

Disclaimer

3,494,352.—*Ronald D. Russo*, East Rutherford, and *James C. Halligan*, Rodburn, N.J. APPARATUS FOR TAKING MULTIPLE SAMPLES. Patent dated Feb. 10, 1970. Disclaimer filed Aug. 20, 1971, by the assignee, *Becton, Dickinson and Company*.

Hereby disclaims the portion of the term of the patent subsequent to Sept. 30, 1986.

[*Official Gazette September 28, 1971.*]